US012654879B2

(12) United States Patent
Datas et al.

(10) Patent No.:   US 12,654,879 B2
(45) Date of Patent:       Jun. 16, 2026

(54) ASSEMBLY PLATFORM INTENDED TO MANIPULATE AT LEAST ONE AIRCRAFT LOWER SHELL WITHOUT DEFORMING IT WITH A VIEW TO ASSEMBLY OF AN AIRCRAFT FUSELAGE BARREL

(71) Applicant: AIRBUS OPERATIONS (S.A.S.),
      Toulouse (FR)

(72) Inventors: Jean-Marc Datas, Toulouse (FR);
      Thomas Cartereau, Toulouse (FR);
      Jacques Bouriquet, Toulouse (FR);
      André Aquila, Blagnac (FR); **Nicolas
      Darbonville, Blagnac (FR); Thomas
      Autret, Blagnac (FR); Joël Barboule**,
      Toulouse (FR); Sébastien Bayonne,
      Toulouse (FR); Patrick Guerin,
      Toulouse (FR); Sjoerd Van Der Veen,
      Toulouse (FR)

(73) Assignee: AIRBUS OPERATIONS (S.A.S.),
      Toulouse (FR)

( * ) Notice:  Subject to any disclaimer, the term of this patent is extended or adjusted under 35 U.S.C. 154(b) by 381 days.

(21) Appl. No.: 18/357,808

(22) Filed: Jul. 24, 2023

(65) Prior Publication Data

US 2024/0025562 A1      Jan. 25, 2024

(30) Foreign Application Priority Data

Jul. 25, 2022    (FR) ...................................... 2207617

(51) Int. Cl.
      *B64F 5/10*        (2017.01)
      *B64C 1/06*        (2006.01)
(52) U.S. Cl.
      CPC ............... *B64F 5/10* (2017.01); *B64C 1/068*
                                                    (2013.01)

(58) Field of Classification Search
      CPC ........... B64F 5/10; B64F 5/50; B23P 2700/01
                                (Continued)

(56) References Cited

U.S. PATENT DOCUMENTS 2,712,874  A  *   7/1955  Murray ..................... B60P 3/11
                                                              254/10 R
2,729,040  A  *   1/1956  Wallace ................ B25B 11/005
                                                              269/21
                                (Continued)

FOREIGN PATENT DOCUMENTS

CN          102001451 B        5/2013
CN          104229158 B        5/2016
                                (Continued)

OTHER PUBLICATIONS

French Search Report for Application No. FR2207617 dated Mar. 1, 2023, 10 pages.

*Primary Examiner* — Jason L Vaughan
(74) *Attorney, Agent, or Firm* — Nixon & Vanderhye, PC

(57)            ABSTRACT

An assembly platform configured to manipulate at least one aircraft lower shell without deforming it with a view to assembly of an aircraft fuselage barrel is disclosed including at least one rectangular chassis, at least two frames having an adjustable trim with respect to the rectangular chassis, at least two setting systems intended to adjust the trim of the frame and at least two cradles fixed onto the frames and intended to receive the lower shell and to hold the lower shell in a desired form. The cradles of the assembly platform make it possible to prevent a deformation of the lower shell during the assembly of the fuselage barrel.

19 Claims, 4 Drawing Sheets

(58) Field of Classification Search
USPC ........................................................ 269/296
See application file for complete search history.

(56) References Cited

U.S. PATENT DOCUMENTS

| | | | | |
|---|---|---|---|---|
| 4,461,455 | A * | 7/1984 | Mills .......................... | B64F 5/50 |
| | | | | 180/125 |
| 4,527,783 | A * | 7/1985 | Collora ................. | B25B 11/005 |
| | | | | 269/297 |
| 6,170,141 | B1 * | 1/2001 | Rossway ................... | B64F 5/50 |
| | | | | 206/319 |
| 6,485,247 | B1 * | 11/2002 | Groves ..................... | B64F 5/50 |
| | | | | 180/125 |
| 7,444,742 | B2 * | 11/2008 | Sturm, Jr. .............. | B23Q 1/035 |
| | | | | 29/712 |
| 7,584,947 | B2 * | 9/2009 | Freeland ............... | B25B 11/005 |
| | | | | 269/297 |
| 8,905,368 | B2 * | 12/2014 | Zameroski .............. | F16F 13/26 |
| | | | | 244/54 |
| 9,249,733 | B2 * | 2/2016 | Hallam ..................... | B64F 5/50 |
| 9,505,051 | B2 * | 11/2016 | Oberoi ................... | F16B 19/06 |
| 9,927,227 | B2 * | 3/2018 | Hunt .................. | G01B 11/2518 |
| 11,034,464 | B2 * | 6/2021 | Hirai ........................ | B21J 15/28 |
| 11,131,982 | B2 * | 9/2021 | Hunt ........................ | B64F 5/10 |
| 11,273,930 | B2 * | 3/2022 | Hunt ........................ | B64F 5/10 |
| 11,987,390 | B2 * | 5/2024 | Godard .................... | B64F 5/10 |
| 2006/0118235 | A1 | 6/2006 | Lum et al. | |
| 2012/0110816 | A1 * | 5/2012 | Groves ................. | F01D 25/285 |
| | | | | 254/7 C |
| 2016/0076879 | A1 * | 3/2016 | Hunt ..................... | G01B 11/24 |
| | | | | 356/601 |
| 2017/0001735 | A1 * | 1/2017 | Darras .............. | B23K 37/0211 |
| 2017/0015440 | A1 | 1/2017 | Hunt et al. | |
| 2022/0097870 | A1 | 3/2022 | Godard et al. | |

FOREIGN PATENT DOCUMENTS

| | | | | |
|---|---|---|---|---|
| EP | 2965836 | A1 | 1/2016 | |
| EP | 2979810 | A1 | 2/2016 | |
| FR | 2788743 | A1 | 7/2000 | |
| FR | 3114573 | B1 | 11/2022 | |
| GB | 2462405 | A * | 2/2010 | ............ B65D 85/68 |
| WO | 2018227298 | A1 | 12/2018 | |

* cited by examiner

ASSEMBLY PLATFORM INTENDED TO MANIPULATE AT LEAST ONE AIRCRAFT LOWER SHELL WITHOUT DEFORMING IT WITH A VIEW TO ASSEMBLY OF AN AIRCRAFT FUSELAGE BARREL

CROSS REFERENCE TO RELATED APPLICATION

This application claims priority to French Application Number FR 2207617, filed Jul. 25, 2022, the entire contents of which is hereby incorporated by reference.

BACKGROUND

The present invention relates to an assembly platform intended to manipulate at least one lower aircraft shell with a view to assembly of a fuselage barrel, while maintaining the form of the lower shell.

A fuselage barrel of an aircraft generally comprises several elements, in particular, a cabin floor grid of the aircraft, a lower shell, two side shells and an upper shell. These elements are manufactured independently of one another and the holes that allow them to be assembled together are drilled prior to their assembly. The assembly of these elements therefore demands the implementation of hole-to-hole assembly or part-to-part assembly techniques in order to ensure that they are well aligned during assembly.

With regard to the lower shell, the form thereof must be maintained during assembly. Indeed, the lower shell can be deformed during assembly. For example, it can twist. That can be a problem during the assembly of the fuselage barrel.

SUMMARY

The present invention contemplates an assembly platform configured to manipulate at least one lower shell of an aircraft with a view to assembly of a fuselage barrel of the aircraft.

According to the invention, the assembly platform comprises at least:
  a rectangular chassis having a longitudinal axis and four corners,
  at least two frames having a longitudinal axis, the at least two frames having a trim that is adjustable with respect to the rectangular chassis,
  at least two setting systems associated with a frame, the at least two setting systems being intended to adjust the trim of the frame with which it is associated with respect to the rectangular chassis,
  at least two cradles, each of at least two cradles being fixed to a frame, the at least two cradles having a generating line parallel to the longitudinal axis of the frame to which it is fixed, the at least two cradles each having at least one reception surface intended to receive the lower shell and hold the lower shell in a desired form.

According to an exemplary embodiment, the reception surface or surfaces of each of the at least two cradles comprise a plurality of rigid pads intended to serve as bearing support for the lower shell on each of the at least two cradles, the plurality of the rigid pads being configured for the lower shell to be held in the desired form when the lower shell is pressed onto the plurality of the rigid pads.

According to an exemplary embodiment, the reception surface or surfaces each comprise at least one fixing device intended to fix the lower shell to the two cradles.

Moreover, the fixing device or devices of the reception surface or surfaces each correspond to a sucker fixed onto the reception surface or surfaces.

In addition, each of the at least two cradles comprises at least one first support structure comprising a first reception zone for a first lateral side of a cradle and at least one second support structure comprising a second reception zone for a second lateral side of a cradle, the first reception zone and the second reception zone of each of the at least two cradles forming a reception surface, the first support structure or structures and the second support structure or structures of each of the at least two cradles being mounted to rotate about a rotation axis parallel to the longitudinal axis of the frame, each of the at least two cradles comprising at least one first damping device each associated with a first support structure and at least one second damping device each associated with a second support structure, the first damping device or devices being configured to bring the associated first support structure or structures to a nominal position about the rotation axis parallel to the longitudinal axis of the frame to which the cradle is fixed, the second damping device or devices being configured to bring the associated second support structure or structures to a nominal position about the rotation axis parallel to the longitudinal axis of the frame to which the cradle is fixed.

Furthermore, the first reception zone of the first support structure or structures of each of the at least two cradles comprises a first sliding half-ring and the second reception zone of the second support structure or structures of each of the at least two cradles comprises a second sliding half-ring, the first sliding half-ring having a first curved longitudinal axis between two longitudinal ends of the first sliding half-ring, the first curved longitudinal axis being in accordance with the first reception zone, the second sliding half-ring having a second curved longitudinal axis between two longitudinal ends of the second sliding half-ring, the second curved longitudinal axis being in accordance with the second reception zone, the first sliding half-ring being configured to slide along the first curved longitudinal axis in a first curved slide of the first support structure or structures of each of the at least two cradles, the second sliding half-ring being configured to slide along the second curved longitudinal axis in a second curved slide of the second support structure or structures of each of the at least two cradles, the first curved slide comprising a spring element at each longitudinal end of the first sliding half-ring to bring the first sliding half-ring into a nominal position, the second curved slide comprising a spring element at each longitudinal end of the second sliding half-ring to bring the second sliding half-ring into a nominal position.

Furthermore, each of the at least two setting systems comprises two setting devices, the two setting devices being fixed to the frame with which the setting system is associated on either side of the longitudinal axis of the frame in line with the cradle, the two setting devices being also fixed to the rectangular chassis, each of the two setting devices of the at least two setting systems being configured to adjust a distance between the rectangular chassis and the frame.

Moreover, the assembly platform comprises four alignment posts each comprising a top arranged to receive a referential positioning device for an aircraft side shell, an alignment post being fixed at each of the four corners and at right angles to the rectangular chassis.

According to an exemplary embodiment, the assembly platform further comprises at least two support posts each comprising a top arranged to receive a positioning device for the side shells, each of the two support posts being fixed at right angles to the rectangular chassis between two align-ment posts on a longitudinal edge of the rectangular chassis.

In addition, each of the at least two support posts has an end opposite the top mounted to rotate about an axis at right angles to the longitudinal axis of the rectangular chassis in such a way that each of the at least two support posts alternately takes a retracted position in which each of the at least two support posts is substantially parallel to the rect-angular chassis and a deployed position in which each of the at least two support posts is substantially at right angles to the rectangular chassis.

Moreover, the assembly platform further comprises a balancing device for the assembly platform intended to keep the rectangular chassis substantially horizontal, the balanc-ing device comprising adjustable feet to which the rectan-gular chassis is fixed, the adjustable feet being adjustable vertically in height, the adjustable feet being intended to be placed on the ground, the adjustable feet being disposed at the four corners of the rectangular chassis.

In addition, each of the two frames comprises a centering pin, the centering pin of each of the two frames being intended to receive a lower shell positioning element.

Advantageously, each of the two frames comprises an alignment arm extending parallel to the longitudinal axis of each of the two frames, the alignment arm of each of the two frames comprising a free end comprising a centering pin, the centering pin of the alignment arm being intended to receive a positioning element of the lower shell.

Moreover, the rectangular chassis comprises at least one housing intended to receive a handling fork parallel to the rectangular chassis with a view to moving the assembly platform from one place to another.

BRIEF DESCRIPTION OF THE DRAWINGS

For an understanding of embodiments of the disclosure, reference is now made to the following description taken in conjunction with the accompanying drawings.

DETAILED DESCRIPTION

Some embodiments will now be described with reference to the Figures.

In the description, "central plane of symmetry" of an object designates a plane which cuts the object into two equal parts in a longitudinal direction of the object. The adjective "lateral" or "side" qualifies a part which is situated on one side and/or on the other side of the central plane of symmetry without cutting the central plane of symmetry.

"Longitudinal ends" of an object designate the longitu-dinally opposite ends of the object.

The adjective "vertical" and the adverb "vertically" refer to the direction of gravity. The adjective "horizontal" and the adverb "horizontally" refer to a direction at right angles to the direction of gravity.

Figure 1:
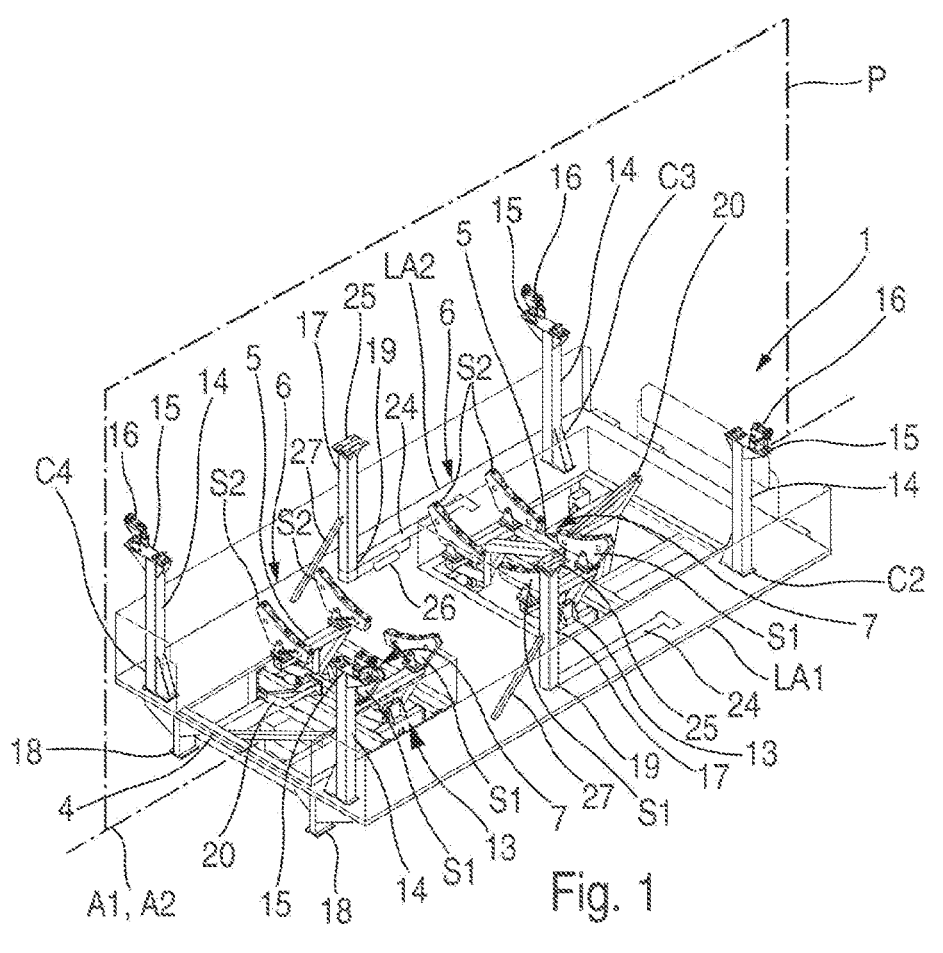
FIG. 1 is a perspective view of an assembly platform according to an exemplary embodiment.
Figure 2:
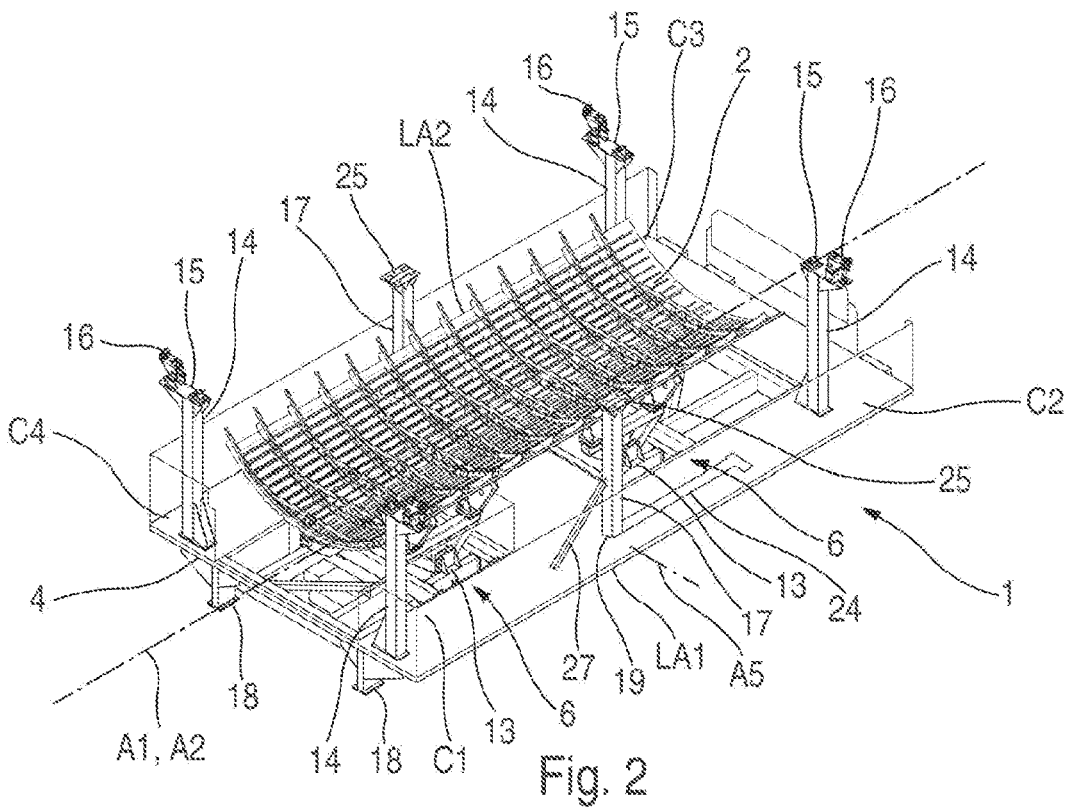
FIG. 2 is a perspective view of an assembly platform receiving a lower shell of a fuselage barrel of an aircraft.

The assembly platform 1 is represented in FIG. 1 and in FIG. 2. The assembly platform 1 is intended to manipulate at least one lower shell 2 of an aircraft AC with a view to assembly of a fuselage barrel 3 of the aircraft AC.

In addition, the adjectives "upper" and "lower" are defined with respect to the ground on which the transport system 1 is likely to be moved. An object qualified by the adjective "lower" is situated closer to the ground than an object qualified by the adjective "upper".

The assembly platform 1 comprises at least a rectangular chassis 4 having a longitudinal axis A1 and four corners C1, C2, C3, C4.

The assembly platform 1 also comprises at least two frames 5 having an adjustable trim that is adjustable with respect to the rectangular chassis 4.

Hereinafter in the description, use of the expression "at least two frames" is omitted, but it is understood that the assembly platform 1 can also comprise more than two frames 5.

Each of the two frames 5 comprises a longitudinal axis A2.

The assembly platform P further comprises at least two cradles 6. In the embodiment represented in FIG. 1, the assembly platform 1 comprises two cradles 6. Hereinafter in the description, use of the expression "at least two cradles" is omitted, but it is understood that the assembly platform 1 can also comprise more than two cradles 6. Each of the two cradles 6 is fixed to a frame 5.

Figure 6:
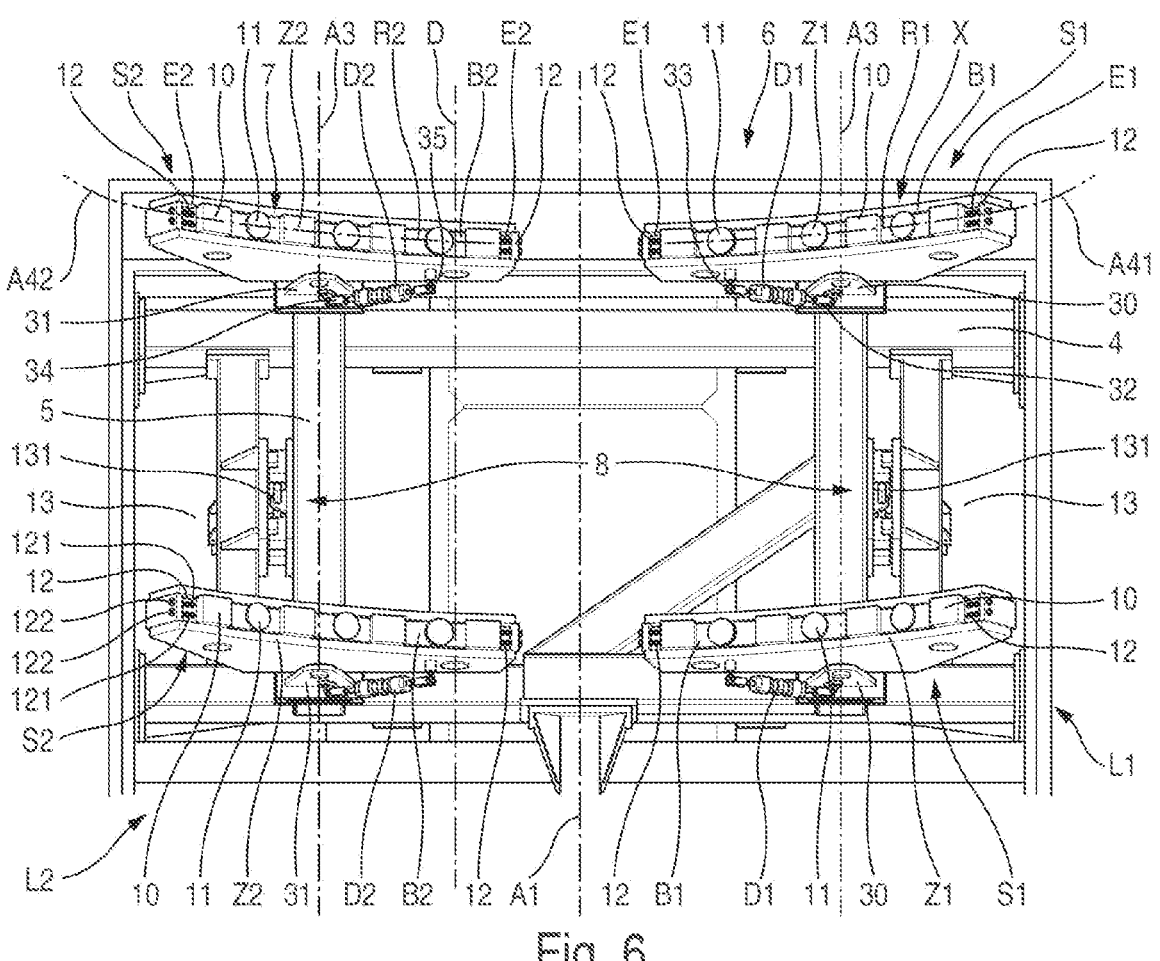
FIG. 6 is a top view of a cradle of an assembly platform.

The assembly platform also comprises at least two setting systems 8 each associated with a frame 5 (FIG. 6). In other words, each setting system 8 is associated with a different frame 5.

Hereinafter in the description, use of the expression "at least two setting systems" is omitted, but it is understood that the assembly platform 1 can also comprise more than two setting systems 8. Each of the two setting systems 8 is intended to adjust the trim of the frame 5 with which it is associated with respect to the rectangular chassis 4.

According to an exemplary embodiment, each of the two setting systems 8 comprises two setting devices 13. The two setting devices 13 are fixed to the frame 5 with which the setting system 8 is associated. The two setting devices 13 of a setting system 8 are disposed on either side of the longitudinal axis A2 of the frame 5 in line with the cradle 6. The two setting devices 13 are also fixed to the rectangular chassis 4. Each of the two setting devices 13 of the two setting systems 8 is configured to adjust a distance between the rectangular chassis 4 and the frame 5.

For example, each of the two setting devices 13 comprises a hydraulic cylinder 131. The hydraulic cylinder 131 of each of the two setting devices 13 has a first end fixed to the rectangular chassis and a second end fixed to the frame 5. For example, the second end is fixed to a side edge of the frame 5. Thus, a hydraulic cylinder 131 is capable of adjusting a distance between a lateral edge of a frame 5 and the rectangular chassis 4.

Each of the two cradles 6 has a cradled surface having a generating line D parallel to the longitudinal axis A2 of the frame 5 to which it is fixed. A generating line of a cradled surface corresponds to a strip which is displaced parallel to itself in the space along a curve (the curve defining the curvature of the cradled surface), in a constant direction. A generating line D corresponds to this straight line at any point along the curve of the cradled surface.

Moreover, the two cradles 6 have a central plane of symmetry (on an axis parallel to the generating line D) which substantially coincides with a plane of central symmetry P of the assembly platform.

The two cradles 6 each have at least one reception surface 7 corresponding to the cradled surface intended to receive the lower shell 2 and hold the lower shell 2 in a desired form of the lower shell 2.

Figure 3:
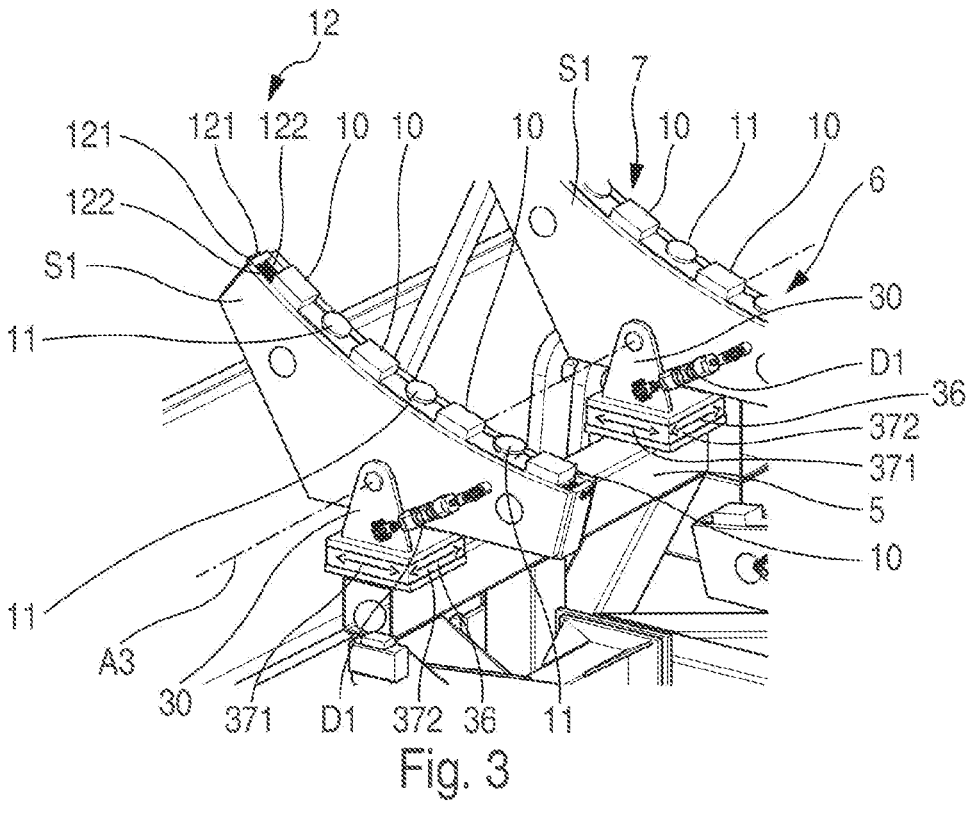
FIG. 3 is a perspective view of a detail of a cradle of an assembly platform.

The reception surface or surfaces 7 of each of the two cradles 6 can comprise a plurality of rigid pads 10 intended to serve as bearing for the lower shell 2 on each of the two cradles 6 (FIG. 3). The plurality of rigid pads 10 are configured for the lower shell 2 to be held in the desired form when the lower shell 2 is pressed onto the plurality of the rigid pads 10. The plurality of the rigid pads 10 determines the desired form of the lower shell 2. The pads 10 of the plurality of the pads 10 are adjustable in position before the lower shell 2 is first received. A periodic check on the plurality of the pads 10 can be performed. For example, the checking can be made a predetermined number of times per year, or after a predetermined number of aircraft AC that have been assembled.

The reception surface or surfaces 7 can each comprise at least one fixing device 11 intended to fix the lower shell 2 to the two cradles 6. When it is said that the fixing device or devices 11 are intended to fix the lower shell 2 to the two cradles 6, this means that the fixing device or devices 11 hold the lower shell 2 on the two cradles 6 without there being any relative movement between the lower shell 2 and the reception surface 7 of the two cradles 6.

Advantageously, the fixing device or devices 11 of the reception surface or surfaces 7 each correspond to a sucker fixed onto the reception surface or surfaces 7 (FIG. 3).

Moreover, each of the two cradles 6 comprises at least a first support structure S1 comprising a first reception zone Z1 for a first lateral side L1 of a cradle 6 and at least a second support structure S2 comprising a second reception zone Z2 for a second lateral side L2 of a cradle 6. The first reception zone Z1 and the second reception zone Z2 of each of the two cradles 6 together form a reception surface 7.

The first support structure or structures S1 is or are symmetrical to the second support structure or structures S2 with respect to a plane of central symmetry P of the assembly platform 1.

As illustrated in Figures and 6, in one embodiment, each of the cradles 6 comprises two first support structures S1 and two second support structures S2.

Figure 4:
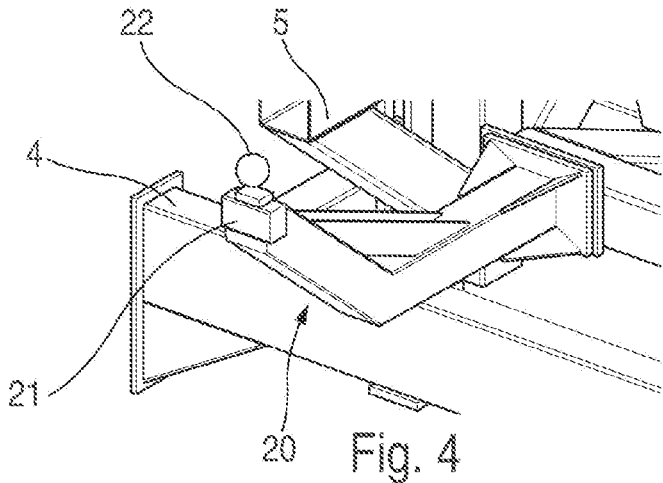
FIG. 4 is a perspective view of an alignment arm of an assembly platform.

The first support structure or structures S1 and the second support structure or structures S2 of each of the two cradles 6 are mounted to rotate with respect to the frame 5 about a rotation axis A3 parallel to the longitudinal axis A2 of the frame 5 (FIG. 4). Each of the two cradles 6 can comprise at least one first U-shaped fixing element 30 fixed to the frame 5 and at least one second U-shaped fixing element 31 fixed to the frame 5. The first U-shaped fixing element or elements 30 and the second U-shaped fixing element or elements 31 each comprise two parallel legs supporting a rotation axis that coincides with the rotation axis A3.

The or each of the first U-shaped fixing elements 30 is associated with a first support structure S1. The or each of the second U-shaped fixing elements 31 is associated with a second support structure S2. The or each of the first support structures S1 of each of the two cradles 6 is mounted to rotate between the two legs of a first U-shaped fixing element 30. The or each of the second support structures S2 of each of the two cradles 6 is mounted to rotate between the two legs of a second U-shaped fixing element 31.

In one embodiment, each of the first U-shaped fixing elements 30 and each of the second U-shaped fixing elements 31 comprise a displacement piece 36. This displacement piece 36 allows each of the first U-shaped fixing elements 30 and each of the second U-shaped fixing elements 31 to be moved by a translational movement 371 at right angles to the rotation axis A3 and a translational movement 372 parallel to the rotation axis A3. In FIG. 3, the translational movement 371 and the translational movement 372 are represented by a double-headed arrow. The displacement piece 36 can correspond to a ball bearing plate.

Each of the two cradles 6 comprises at least one first damping device D1 and at least one second damping device D2. The or each of the first damping devices D1 is associated with a first support structure S1. The or each of the second damping devices D2 is associated with a second support structure S2.

The first damping device or devices D1 is or are configured to bring the associated first support structure or structures S1 to a nominal position about the rotation axis A3 parallel to the longitudinal axis A2 of the frame 5 to which the cradle 6 is fixed. Similarly, the second damping device or devices D2 is or are configured to bring the associated second support structure or structures S2 to a nominal position about the rotation axis A3 parallel to the longitudinal axis A2 of the frame 5 to which the cradle 6 is fixed. The nominal position of the support structures S1 and S2 corresponds to a position in which the support structures S1 and S2 are not stressed by a force, particularly when the lower shell 2 is not received on the cradles 6.

In one embodiment (FIG. 6), the or each of the first damping devices D1 comprises a first end 32 fixed to a first U-shaped fixing element 30 and a second end 33 fixed to the associated first support structure S1. The or each of the second damping devices D2 comprises a first end 34 fixed to a second U-shaped fixing element 31 and a second end 35 fixed to the associated second support structure S2.

The first reception zone Z1 of the first support structure or structures S1 of each of the two cradles 6 can comprise a first sliding half-ring B1. Similarly, the second reception zone Z2 of the second support structure or structures S2 of each of the two cradles 6 can comprise a second sliding half-ring B2.

The first sliding half-ring B1 has a first curved longitudinal axis A41 between its two longitudinal ends E1. The first curved longitudinal axis A41 conforms to the first reception zone Z1. Similarly, the second sliding half-ring B2 has a second curved longitudinal axis A42 between its two longitudinal ends E2. The second curved longitudinal axis A42 conforms to the second reception zone Z2.

The first sliding half-ring B1 is configured to slide along the first curved longitudinal axis A41 in a first curved slide R1 of the first support structure or structures S1 of each of the two cradles 6. Similarly, the second sliding half-ring B2 is configured to slide along the second curved longitudinal axis A42 in a second curved slide R2 of the second support structure or structures S2 of each of the two cradles 6.

A slide corresponds to a groove formed in the support structures S1 and S2 to make the sliding half-rings B1 and B2 slide.

The first curved slide R1 of the first support structure or structures S1 of each of the two cradles 6 has a longitudinal axis parallel to the first curved longitudinal axis A41. The second curved slide R2 of the second support structure or structures S2 of each of the two cradles 6 has a longitudinal axis parallel to the second curved longitudinal axis A42.

The first curved slide R1 comprises a spring element 12 at each longitudinal end E1 of the first sliding half-ring B1. The spring element 12 of each end of the first sliding half-ring B1 exerts a force parallel to the first curved longitudinal axis A41 to bring the first sliding half-ring B1 into a nominal position. Similarly, the second curved slide R2 comprises a spring element 12 at each longitudinal end E2 of the second sliding half-ring B2. The spring element 12 of each end of the second sliding half-ring B2 exerts a force parallel to the second curved longitudinal axis A42 to bring the second sliding half-ring B2 into a nominal position. The nominal position of the sliding half-rings B1 and B2 corresponds to a position in which the sliding half-rings B1 and B2 are not stressed by a force, in particular when the lower shell 2 is not received on the cradles 6.

In the embodiment illustrated in FIG. 6, the spring element 12 of the ends of the first sliding half-ring or rings B1 and the ends of the second sliding half-ring or rings B2 comprises two helical springs 121 having a longitudinal axis parallel to the first curved longitudinal axis A41 and a second curved longitudinal axis A42, respectively. The spring element 12 can also comprise a guiding rod per helical spring 121. The guiding rod has a longitudinal axis parallel to the first curved longitudinal axis A41 and a second curved longitudinal axis A42, respectively. A guiding rod can be screwed by a screwing element 122 to each of the ends E1, E2 of the slides R1 and R2. The fixing device or devices 11 (for example the suckers) and/or the plurality of the rigid pads 10 are fixed onto the first sliding half-ring B1 and the second sliding half-ring B2.

Moreover, the assembly platform 1 comprises four alignment posts 14 each comprising a top arranged to receive an aircraft AC side shell positioning referential device 16. An alignment post 14 is fixed to each of the four corners C1, C2, C3, C4. Each of the alignment posts 14 has a longitudinal axis at right angles to the rectangular chassis 4.

For example, the referential positioning device 16 corresponds to a device intended to position with respect to one another at least one cabin floor grid (not represented) and two side shells (not represented) of an aircraft AC with a view to an assembly of a fuselage barrel 3 of the aircraft AC.

Advantageously, the assembly platform 1 can further comprise at least two support posts 17 each comprising a top 25 arranged to receive a fixing device to which the side shells are fixed. Each of the two support posts 17 is fixed at right angles to the rectangular chassis 4 between two alignment posts 14 on a longitudinal edge LA1, LA2 of the rectangular chassis 4.

The presence or the absence of the support posts 17 can depend on the length of the fuselage barrel 3 to be assembled. Indeed, the presence of the support posts 17 may be necessary if the length of the fuselage body 3 to be assembled has a length that can result in a bending of the cabin floor grid and/or of the two side shells between the alignment posts 14 under their own weight.

Furthermore, each of the at least two support posts 17 has an end 19 opposite the top 25 mounted to rotate about an axis A5 at right angles to the longitudinal axis A1 of the rectangular chassis 4 in such a way that each of the at least two support posts 17 alternately takes a retracted position and a deployed position. In the retracted position, each of the at least two support posts 17 is substantially parallel to the rectangular chassis 4. In the deployed position, each of the at least two support posts 17 is substantially at right angles to the rectangular chassis 4. In FIG. 1 and FIG. 2, the support posts 17 are in the deployed position.

As represented in FIGS. 1 and 2, the rectangular chassis 4 can also comprise at least two housings 24. Each of the two housings 24 is intended to house a support post 17 when this support post 17 is in the retracted position.

Figures 7, 8:
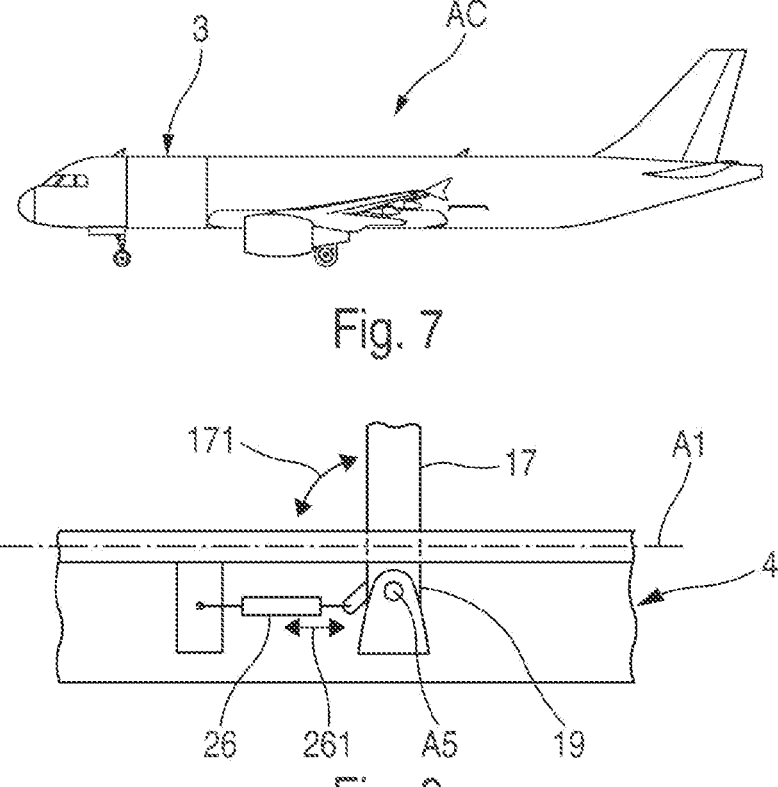
FIG. 7 is a schematic profile view of an aircraft compris-ing a fuselage barrel.
FIG. 8 is a schematic profile view of a detail of the assembly platform comprising a cylinder device.

As represented in FIGS. 1 and 8, each of the at least two support posts 17 can further comprise a cylinder device 26. The cylinder device 26 is configured to drive the support post 17 from the retracted position to the deployed position and vice-versa about the axis A5 at right angles to the longitudinal axis A1 of the rectangular chassis 4. For example, the cylinder device 26 is fixed to the end 19. In FIG. 1, a cylinder device 26 is represented by transparency under the rectangular chassis 4. For the purposes of clarity of FIG. 1, only one cylinder device 6 is represented.

In FIG. 8, the translational driving movement 261 (represented by a double-headed arrow 261 in FIG. 8) generated by the cylinder device 26 brings a rotational movement 171 (represented by a double-headed arrow 171) of the support post 17 about the axis A5 at the end 19.

Furthermore, as represented in FIG. 1 and FIG. 2, each of the support posts 17 can comprise a prop 27 configured to hold each of the support posts 17 in a position substantially at right angles to the rectangular chassis 4. The prop 27 of each of the support posts 17 comprises an end fixed to the rectangular chassis 4 and an end fixed to the support post 17 between the end 19 and the top 25.

Figure 5:
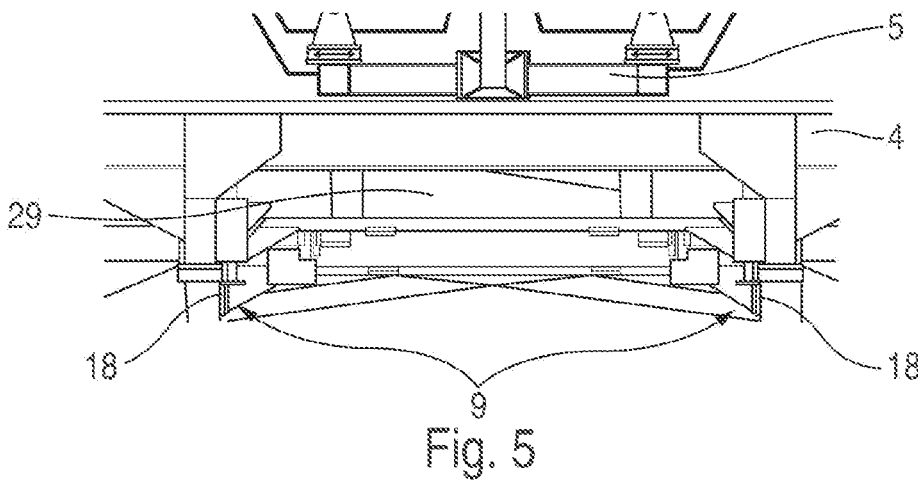
FIG. 5 is a front view of a longitudinal edge of an assembly platform.

Furthermore, the assembly platform 1 can comprise a balancing device 9 for the assembly platform 1 (FIG. 5). The balancing device 9 is intended to keep the rectangular chassis 4 substantially horizontal. The balancing device 9 can comprise adjustable feet 18 to which the rectangular chassis 4 is fixed. The adjustable feet 18 are adjustable vertically in height. The adjustable feet 18 are intended to be placed on the ground. The adjustable feet 18 are disposed at the four corners C1, C2, C3, C4 of the rectangular chassis 4.

Each of the adjustable feet 18 can comprise a cylinder making it possible to adjust their height. For example, the cylinder of each of the adjustable feet 18 can correspond to a hydraulic cylinder which can be remotely controlled.

Each of the adjustable feet 18 can also correspond to a foot that can be adjusted by screwing or unscrewing. For example, the unscrewing makes it possible to increase the height of the adjustable foot 18 and the screwing makes it possible to reduce the height of the adjustable foot 18.

Each of the two frames 5 can comprise a centering pin 22. The centering pin 22 of each of the two frames 5 is intended to receive a positioning element of the lower shell 2. This centering pin 22 makes it possible to place the lower shell 2 on the assembly platform 1 in such a way that the longitudinal axis of the lower shell 2 is substantially parallel to the longitudinal axis A1 of the rectangular chassis 4.

According to a variant, each of the two frames 5 can comprise an alignment arm 20 extending parallel to the longitudinal axis A2 of each of the two frames 5. The alignment arm 20 comprises a free end 21 comprising a centering pin 22 (FIG. 4).

This centering pin 22 is intended to receive a positioning element of the lower shell 2. This positioning element of the lower shell 2 can correspond to an element having a form complementing the form of the centering pin 22. This centering pin 22 makes it possible to place the lower shell 2 on the assembly platform 1 in such a way that the longitudinal axis of the lower shell 2 is substantially parallel to the longitudinal axis A1 of the rectangular chassis 4.

For example, the centering pin 22 of one of the two frames 5 and the centering pin 22 of the other of the two frames 5 are aligned on a line parallel to the longitudinal axis A1 of the rectangular chassis 4.

According to an exemplary embodiment (FIG. 5), the rectangular chassis 4 can comprise at least one housing 23 intended to receive a handling fork parallel to the rectangular chassis 4 with a view to moving the assembly platform 1 from one place to another.

According to an exemplary embodiment, the assembly platform can comprise wheels (not represented) mounted under the rectangular chassis 4 with a view to moving the assembly platform 1 from one place to another. These wheels can be retractable.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly platform configured for manipulating at least one lower shell of an aircraft (AC) in order to assemble a fuselage barrel of the aircraft (AC), comprising:

a rectangular chassis having a longitudinal axis (A1) and four corners (C1, C2, C3, C4), at least two frames having a longitudinal axis (A2), the at least two frames having a trim that is adjustable with respect to the rectangular chassis, at least two setting systems associated with a frame, the at least two setting systems being intended to adjust the trim of the frame with which it is associated with respect to the rectangular chassis, at least two cradles, each of the at least two cradles being fixed onto to the at least two frame, the at least two cradles having a generating line (D) parallel to the longitudinal axis (A2) of the frame to which it is fixed, the at least two cradles each having at least one reception surface intended to receive the lower shell and to hold the lower shell in a desired form, and wherein each of the two frames comprises an alignment arm extending parallel to the longitudinal axis (A2) of each of the two frames, the alignment arm of each of the two frames comprising a free end comprising a centering pin, the centering pin of the alignment arm being intended to receive a positioning element of the lower shell.

2. The platform as claimed in claim 1, wherein the reception surface or surfaces of each of the at least two cradles comprise a plurality of rigid pads configured to serve as bearing support for the lower shell on each of the at least two cradles, the plurality of the rigid pads being configured for the lower shell to be held in the desired form when the lower shell is pressed onto the plurality of the rigid pads.

3. The platform as claimed in claim 1, wherein the reception surface or surfaces each comprise at least one fixing device intended to fix the lower shell to the two cradles.

4. The platform as claimed in claim 3, wherein the fixing device or devices of the reception surface or surfaces each correspond to a sucker fixed onto the reception surface or surfaces.

5. The platform as claimed in claim 1, wherein each of the at least two cradles comprises at least one first support structure (S1) comprising a first reception zone (Z1) for a first lateral side (L1) of a cradle and at least one second support structure (S2) comprising a second reception zone (Z2) for a second lateral side (L2) of a cradle, the first reception zone (Z1) and the second reception zone (Z2) of each of the at least two cradles forming a reception surface, the first support structure or structures (S1) and the second support structure or structures (S2) of each of the at least two cradles being mounted to rotate about a rotation axis (A3) parallel to the longitudinal axis (A2) of the frame, each of the at least two cradles comprising at least one first damping device (D1) each associated with a first support structure (S1) and at least one second damping device (D2) each associated with a second support structure (S2), the first damping device or devices (D1) being configured to bring the associated first support structure or structures (S1) to a nominal position about the rotation axis (A3) parallel to the longitudinal axis (A2) of the frame to which the cradle is fixed, the second damping device or devices (D2) being configured to bring the associated second support structure or structures (S2) to a nominal position about the rotation axis (A3) parallel to the longitudinal axis (A2) of the frame to which the cradle is fixed.

6. The platform as claimed in claim 5, wherein the first reception zone (Z1) of the first support structure or structures (S1) of each of the at least two cradles comprises a first sliding half-ring (B1) and the second reception zone (Z2) of the second support structure or structures (S2) of each of the at least two cradles comprises a second sliding half-ring (B2), the first sliding half-ring (B1) having a first curved longitudinal axis (A41) between two longitudinal ends (E1) of the first sliding half-ring (B1), the first curved longitudinal axis (A41) being in accordance with the first reception zone (Z1), the second sliding half-ring (B2) having a second curved longitudinal axis (A42) between two longitudinal ends (E2) of the second sliding half-ring (B2), the second curved longitudinal axis (A42) being in accordance with the second reception zone (Z2), the first sliding half-ring (B1) being configured to slide along the first curved longitudinal axis (A41) in a first curved slide (R1) of the first support structure or structures (S1) of each of the at least two cradles, the second sliding half-ring (B2) being configured to slide along the second curved longitudinal axis (A42) in a second curved slide (R2) of the second support structure or structures (S2) of each of the at least two cradles, the first curved slide (R1) comprising a spring element at each longitudinal end (E1) of the first sliding half-ring (B1) to bring the first sliding half-ring (B1) into a nominal position, the second curved slide (R2) comprising a spring element at each longitudinal end (E2)

of the second sliding half-ring (B2) to bring the second sliding half-ring (B2) into a nominal position.

7. The platform as claimed in claim 1, wherein each of the at least two setting systems comprises two setting devices, the two setting devices being fixed to the frame with which the setting system is associated on either side of the longitudinal axis (A2) of the frame in line with the cradle, the two setting devices being also fixed to the rectangular chassis, each of the two setting devices of the at least two setting systems being configured to adjust a distance between the rectangular chassis and the frame.

8. The platform as claimed in claim 1, further comprising four alignment posts each comprising a top arranged to receive a referential positioning device of an aircraft side shell, an alignment post being fixed at each of the four corners (C1, C2, C3, C4) and at right angles to the rectangular chassis.

9. The platform as claimed in claim 1, further comprising at least two support posts each comprising a top arranged to receive a positioning device for the side shells, each of the two support posts being fixed at right angles to the rectangular chassis between two alignment posts on a longitudinal edge (LA1, LA2) of the rectangular chassis.

10. The platform as claimed in claim 9, wherein each of the at least
  two support posts has an end opposite the top mounted to rotate about an axis (A5) at right angles to the longitudinal axis (A1) of the rectangular chassis in such a way that each of the at least two support posts alternately takes a retracted position in which each of the at least two support posts is substantially parallel to the rectangular chassis and a deployed position in which each of the at least two support posts is substantially at right angles to the rectangular chassis.

11. The platform as claimed in claim 1, wherein it further comprises a balancing device
  for the assembly platform intended to hold the rectangular chassis substantially horizontal, the balancing device comprising adjustable feet to which the rectangular chassis is fixed, the adjustable feet being adjustable vertically in height, the adjustable feet being intended to be placed on the ground, the adjustable feet being disposed at the four corners (C1, C2, C3, C4) of the rectangular chassis.

12. The platform as claimed in claim 1, wherein each of the two frames (5) comprises
  a centering pin, the centering pin of each of the two frames being intended to receive a positioning element of the lower shell.

13. The platform as claimed in claim 1, wherein the rectangular chassis comprises at
  least one housing intended to receive a handling fork parallel to the rectangular chassis in order to move the assembly platform from one place to another.

14. An assembly platform configured for manipulating at least one lower shell of an aircraft (AC) in order to assemble a fuselage barrel of the aircraft (AC), comprising:
  a rectangular chassis having a longitudinal axis (A1) and four corners (C1, C2, C3, C4), at least two frames having a longitudinal axis (A2), the at least two frames having a trim that is adjustable with respect to the rectangular chassis, at least two setting systems associated with a frame, the at least two setting systems being intended to adjust the trim of the frame with which it is associated with respect to the rectangular chassis, at least two cradles, each of the at least two cradles being fixed onto to the at least two frame, the at least two cradles having a generating line (D) parallel to the longitudinal axis (A2) of the frame to which it is fixed, the at least two cradles each having at least one reception surface intended to receive the lower shell and to hold the lower shell in a desired form, wherein each of the at least two cradles comprises at least one first support structure (S1) comprising a first reception zone (Z1) for a first lateral side (L1) of a cradle and at least one second support structure (S2) comprising a second reception zone (Z2) for a second lateral side (L2) of a cradle, and each of the at least two cradles comprising at least one first damping device (D1) each associated with a first support structure (S1) and at least one second damping device (D2) each associated with a second support structure (S2).

15. The platform as claimed in claim 14, wherein each of the two frames comprises an alignment arm extending parallel to the longitudinal axis (A2) of each of the two frames, the alignment arm of each of the two frames comprising a free end comprising a centering pin, the centering pin of the alignment arm being intended to receive a positioning element of the lower shell.

16. The platform as claimed in claim 14, wherein the reception surface or surfaces of each of the at least two cradles comprise a plurality of rigid pads configured to serve as bearing support for the lower shell on each of the at least two cradles, the plurality of the rigid pads being configured for the lower shell to be held in the desired form when the lower shell is pressed onto the plurality of the rigid pads.

17. The platform as claimed in claim 14, wherein the reception surface or surfaces each comprises at least one fixing device intended to fix the lower shell to the two cradles.

18. The platform as claimed in claim 17, wherein the fixing device or devices of the reception surface or surfaces each correspond to a sucker fixed onto the reception surface or surfaces.

19. The platform as claimed in claim 14, wherein each of the at least two setting systems comprises two setting devices, the two setting devices being fixed to the frame with which the setting system is associated on either side of the longitudinal axis (A2) of the frame in line with the cradle, the two setting devices being also fixed to the rectangular chassis, each of the two setting devices of the at least two setting systems being configured to adjust a distance between the rectangular chassis and the frame.

* * * * *